(12) United States Patent
Weigold et al.

(10) Patent No.: US 11,073,278 B2
(45) Date of Patent: *Jul. 27, 2021

(54) VAPORIZATION APPARATUS

(71) Applicant: Tinman Inc., Boise, ID (US)

(72) Inventors: Theodore S. Weigold, Boise, ID (US); Laurence Davies, Winnipeg (CA); Shane M. Touchette, Boise, ID (US)

(73) Assignee: Tinman Inc, Boise, ID (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/954,050

(22) Filed: Apr. 16, 2018

(65) Prior Publication Data

US 2019/0056101 A1     Feb. 21, 2019

Related U.S. Application Data

(63) Continuation-in-part of application No. 13/651,985, filed on Oct. 15, 2012, now Pat. No. 9,945,554.
(Continued)

(51) Int. Cl.
*F22B 1/18* (2006.01)
*F28C 3/08* (2006.01)
(Continued)

(52) U.S. Cl.
CPC ............ *F22B 1/1807* (2013.01); *F01K 23/10* (2013.01); *F22B 1/1853* (2013.01); *F22B 27/16* (2013.01);
(Continued)

(58) Field of Classification Search
CPC ...... F01K 23/065; F01K 23/10–23/105; F28D 7/10–7/12; F22B 27/16; F22B 1/287; F22B 37/60
(Continued)

(56) References Cited

U.S. PATENT DOCUMENTS 1,775,939 A * 9/1930 Matthaei ............ B60H 1/00335
                                                         165/155
2,752,128 A * 6/1956 Dedo ........................ F28D 7/10
                                                         165/155
(Continued)

FOREIGN PATENT DOCUMENTS

FR     2287648 A1 * 5/1976 ................ F22B 7/02
GB     1428032 A  * 3/1976 .............. F22B 27/16

*Primary Examiner* — Laert Dounis
(74) *Attorney, Agent, or Firm* — Adrian D. Battison; Ade & Company Inc.; Ryan W. Dupuis

(57) ABSTRACT

Liquid is flash evaporated in a series of cells along and surrounding an exhaust duct to generate a pressurized vapor where at least one of the surfaces is in communication with the source of heat sufficient to maintain the surface at a temperature such that the liquid injected into the chamber is substantially instantly converted to a superheated vapor with no liquid pooling within the chamber. The liquid is introduced by controlled injectors operating at a required rate. Each of the cells is periodically discharged by a pressure controlled relief valve and the vapor from the cells combined to form a continuous stream feeding a turbine or other energy conversion device. The outer wall of the cell is offset so that it contacts the inner wall at one point around the periphery. Heat transfer ribs and bars can be provided in the duct to provide increased heat transfer where necessary.

19 Claims, 7 Drawing Sheets

Related U.S. Application Data

(60) Provisional application No. 61/546,952, filed on Oct. 13, 2011.

(51) Int. Cl.
 *F01K 23/10* (2006.01)
 *F22B 27/16* (2006.01)
 *F02G 5/02* (2006.01)

(52) U.S. Cl.
 CPC .................. *F28C 3/08* (2013.01); *F02G 5/02* (2013.01); *Y02E 20/30* (2013.01); *Y02T 10/12* (2013.01)

(58) Field of Classification Search
 USPC ......................................................... 165/141
 See application file for complete search history.

(56) References Cited

U.S. PATENT DOCUMENTS

| | | | | |
|---|---|---|---|---|
| 2,790,428 A * | 4/1957 | Buttler | ..................... | F22B 3/06 122/156 |
| 3,238,902 A * | 3/1966 | Escher | ................... | F23M 20/00 110/304 |
| 3,453,840 A * | 7/1969 | Koichi | ................... | F24F 3/001 62/324.4 |
| 4,479,359 A * | 10/1984 | Pelloux-Gervais | ....... | F17C 9/02 62/50.2 |
| 4,497,365 A * | 2/1985 | Boyer | ..................... | F28D 7/106 165/154 |
| 4,901,531 A * | 2/1990 | Kubo | ..................... | F01K 23/065 60/618 |
| 4,938,173 A * | 7/1990 | Hopkinson | ........... | F22B 35/005 122/40 |
| 6,688,138 B2 * | 2/2004 | DiFlora | ................ | F28D 1/0535 62/509 |
| 9,945,554 B2 * | 4/2018 | Weigold | ................ | F22G 7/14 |
| 2011/0067839 A1 * | 3/2011 | Norton | ................... | B64D 13/00 165/104.12 |
| 2011/0259553 A1 * | 10/2011 | Filippone | .................. | F01N 5/02 165/104.21 |
| 2012/0222845 A1 * | 9/2012 | Kinder | .................... | F28F 13/12 165/154 |
| 2012/0240868 A1 * | 9/2012 | Sumi | ..................... | F24H 9/0026 122/13.01 |

\* cited by examiner

VAPORIZATION APPARATUS

This application is a continuation in part application of application Ser. No. 13/651,985 filed Oct. 15, 2012 and now issued as U.S. Pat. No. 9,945,554 on Apr. 17, 2018. This application claims the benefit under 35 USC 119 (e) of Provisional Application 61/546,952 filed Oct. 13, 2011.

This invention relates to an apparatus for vaporization which can be used for example in a Rankine cycle engine to generate power from waste heat using a turbine. Such waste heat is often available from the exhaust gases of various combustion systems, such as internal combustion engines or furnaces, but other sources of heat can be used. In addition other uses of the vaporized gas, typically steam, are possible.

BACKGROUND OF THE INVENTION

BMW have worked in this area and have at least U.S. Pat. No. 6,834,503 (Freyman) and 7520133 (Hoetger) which show proposals in this area.

However there remains difficulty in providing a heat exchanger which extracts heat at a suitable efficiency to make this system operate effectively. Typical heat exchanger use tubes often with fins to transfer heat from the heating medium into liquid carried within the tube so that the liquid in the tube evaporates and discharges as steam at the remote end of the tube.

SUMMARY OF THE INVENTION

It is one object of the invention to provide an improved method for evaporating liquid to generate vapour typically but not necessarily to be used to drive a turbine.

According to a first aspect of the invention there is provided a method for evaporating water to generate pressurized steam comprising:

passing a heated gas through a duct along a longitudinal direction of the duct from a feed end of the duct to a discharge end of the duct;

the duct including a duct wall surrounding an axis of the duct with the duct wall extending continuously in the longitudinal direction from the feed end at one longitudinal end of the duct to the discharge end at the other end of the longitudinal duct;

a peripheral wall surrounding the duct at a position on the duct between the feed end and the discharge end defining a chamber between the peripheral wall and the duct wall;

dividing the chamber by dividing walls into a plurality of separate cells;

injecting the water as a water spray into each of the cells through an injector nozzle mounted in the peripheral wall directed into the chamber from the peripheral wall toward an outside surface of the duct wall;

causing the water spray injected into the chamber to be converted substantially instantaneously to steam with no water pooling within the chamber by maintaining a required pressure within the chamber and by maintaining the heated gas inside the duct at a required temperature;

and collecting the steam from for each of the cells.

In one embodiment the chamber is divided by said plurality of divider walls which extend transverse to the axis of the duct and arranged at axially spaced positions along the axis of the duct so as to divide the chamber into a plurality of axially separated cells arranged end to end along the duct.

In another embodiment, the dividing walls form fins running longitudinally of the duct and connecting the duct wall and the peripheral wall so as to form a plurality of pairs of longitudinal channels that are adjacent and operate as a pair with the water injection nozzle being at one end of a first channel of the pair, and the extraction of the steam being taken from an adjacent end of the second channel of the pair and the pair being interconnected at the opposite end thus creating a steam pathway that is twice the length of the channels. Preferably in this arrangement, the injection nozzle and the steam outlet are arranged at the feed end of the duct. The fins can be arranged at an angle to the longitudinal axis of the duct so as to form a helical auger flight. Alternatively the construction can use other heat distribution devices designed to force passing hot gasses to sweep maximum surface area. In this model which can be 3D printed with fins running the length of the device connecting the inner and outer shells together. In this way two that are adjacent operate as a pair creating a steam pathway that is two times the length of the device, forming a "U" shaped pathway with water being injected at the "front end" and where steam is extracted from the adjacent member of the pair. In other words this is a new design eliminating the "C" or "half-moon" shaped walls, presently dividing the cells so as to allow differential addition of water and looking to "milk" heat progressively down the length of the device out of metal heated by hot gas. Instead in this alternative design, divisions are the ring of paired fins connecting the inner and outer non-concentric tubes where the entire length of the device is adding heat to the flash steam being generated near the inlet end, then pumping it up over a long pathway until it finally reaches the exit, also at the hottest area/end of the device.

Preferably in all of the embodiments herein, each divider wall has an inner edge in engagement with the duct wall and an outer edge in engagement with the peripheral wall so that each cell is separated from a next adjacent cell by a respective one of the divider walls to prevent the passage of steam from one cell to the next adjacent cell.

Preferably in all of the embodiments herein, the temperature in the cell is greater than 250 degrees F. so as to generate superheated steam instantly.

Preferably in all of the embodiments herein, the pressure in the cell is maintained greater than 40 psi.

Typically the temperature and pressure will be higher than these values as the saturation point for 40 psi is 286° F., whereas 250° F. yields only 15.1 psi. Neither of these is superheated.

Preferably in all of the embodiments herein, the method includes transferring heat using heat conducting elements within the duct conducting heat to each cell wherein a first cell includes first heat conducting elements and a second subsequent cell includes second heat conducting elements and wherein the first and second heat conducting elements are arranged such that an amount of heat transferred by the first conducting elements within the duct to the first cell is less than that transferred by the second conducting elements within the duct to the second subsequent cell.

That is there is more heat at the beginning of the heated core than at the exhaust end. It is the metered flow of water going in that "milks" heat gradually out of the metal. Essentially there is much more going into the first cells, where it is intensely hot, and less downstream where it takes less water to maintain heat transfer without flooding the cells with water. If that happened, then those cells so affected would be nothing more than a water tube boiler which is not the intention in the present application.

Preferably in all of the embodiments herein, the liquid is injected from a nozzle at the peripheral wall onto the duct.

Preferably in all of the embodiments herein, the outlet for the steam is provided in the peripheral wall.

Preferably in all of the embodiments herein, the peripheral wall is axially offset from the duct wall so that a portion of an inside surface of the peripheral wall extending longitudinally along the peripheral wall is in contact with a portion of an outside surface of the duct wall extending longitudinally along the duct wall.

Preferably in all of the embodiments herein, there are provided heat conducting elements inside the duct communicating with the duct wall.

Preferably in all of the embodiments herein, the duct extends in a straight path with the cells arranged along the straight path.

Preferably in all of the embodiments herein, the steam collected from the cells is transferred back to the receive extra heat from the heat source for superheating the steam. In one arrangement, the collected steam is transferred back to one cell between the duct and the peripheral wall for receiving the extra heat. In another arrangement the collected steam is transferred to a conduit in communication with an exhaust flue. In order to generate the superheat to the steam, the extra cell or the duct in the flue without addition of further injected water.

Preferably in all of the embodiments herein, the duct has an exterior surface which is pebbled or roughened to provide a greater surface area.

Preferably in all of the embodiments herein, the method includes transferring heat using heat conducting elements within the duct where the heat conducting elements extending across the duct comprise hollow tubes extending through the duct wall so as to provide a communication between an interior of the hollow duct and the chamber. In this arrangement, preferably the hollow tubes include a portion thereof projecting outwardly from the duct wall into the chamber. In this arrangement, preferably the hollow tubes are closed at an end within the duct spaced from the wall of the duct.

Thus the dead end of each tube is plugged, the open end is flush welded making it possible to assemble the rest of the fixtures. The dividing walls which are crescent shaped that define cell boundaries have to slide over and around the inner duct. If the cross tubes were not flush, that would be impossible, as the dividing walls when slid down the pipe would be hung up on any protrusions.

Preferably in all of the embodiments herein, the hollow tubes have a cross section which is circular which will withstand much higher rpressure than a non-circular arrangement. However if used a non-circular arrangement can be used so as to cause diversion of air flowing in the duct toward one side of the duct. This can be oval or elliptical or rectangular with the longer axis inclined to the longitudinal direction of the duct so that the tube has an outer surface which acts to guide the gas flowing along the duct toward one side of the wall. In this arrangement, preferably each hollow tube is angularly rotated around an axis of the duct from the next. Thus the hollow fingers, attached at one end to become part of the pressure vessel, with the opposite end sealed (plugged), as in current embodiment. The tubes are preferably shaped as "flattened" ovals that are set to angular displacements to accentuate a swirling flow of hot gas although the same effect could be created using rectangular tube similarly positioned.

The hollow tubes, by the way they are attached, become part of the pressure vessel that surrounds the heated core.

The cross tubes can land wherever so that if they become part of a pair of heated longitudinal compartments, so much the better. The tubes are both a heat transfer accelerator and a method of avoiding laminar flow in the heated core, insuring disturbed and thoroughly mixed hot gasses as they flow from inlet to exhaust.

Preferably in all of the embodiments herein, the water is injected into the cells by atomizing nozzles at water injection points.

In order to more easily manufacture the complex wall structures required, preferably the duct, dividing walls and peripheral wall are formed as an integral structure by 3D printing.

Preferably in all of the embodiments herein, the heated gas is injected by an inlet feed which includes a vena contracta at the inlet end. The vena contracta at the inletting end acts to ingest an optimized air/fuel mixture, which in typical boilers and heaters yields a stack gas oxygen concentration of approximately 2%.

Preferably in all of the embodiments herein, the steam is extracted from each cell by an outlet dome arrangement including a first dome portion of larger cross-section into which the steam escapes and smaller cross-section outlet at an outer wall of the dome portion through which the steam escapes from the dome portion.

The method herein therefore can be used to form two types of steam, saturated and superheated. The superheated steam is formed by redirecting saturated steam within the unit to add heat either within an additional or dedicated cell or within the outlet flue. In some cases the steam emitted by the cells can be at 400 degrees F. with the flue gases being at around 700 so as to provide significant additional heat to be added in to the steam.

Superheated steam is steam at a temperature that is higher than its vaporization (boiling) point at the absolute pressure. It is steam which is formed at the temperature which exceeds that of saturated steam at the same pressure. Thus extra heat is packed into the steam so that it is steam which has absorbed more heat than it carried at the saturation point.

Superheated steam is used in turbines to improve thermal efficiency. Other uses include:

Surface technologies
Cleaning technologies
Catalysis/chemical reaction processing
Surface drying technologies
Curing technologies
Soil steaming
Energy systems
Nanotechnologies The steam can thus be super heater alternatively at "front" (i.e., as the first cell), or in exhaust stack after collected in manifold, or the arrangement can configure a manifold to join inside the passing exhaust having turned a "U" (180°) to run back to the locus of the inlet. From that point then steam is routed to point(s) of use and exhaust released. The superheating elements receive only already generated steam and they receive no additional water. In other words they only ingest steam, providing an opportunity for it to absorb additional heat.

The key point therefore is that the cell causes very rapid, essentially instantaneous, simultaneous flash evaporation of the liquid to form the gas. In order to achieve this, the temperature of the cell cannot be allowed ever to drop so that the flash evaporation halts and liquid is allowed to pool. The liquid is thus fed into the cell throughout the cell rather than at one end. The system is designed so that the amount of heat from the heat source is matched to the liquid injection so that maximum heat is extracted while no part of the cell is cooled to a temperature so that flash evaporation halts at that area.

The liquid is typically water but other liquids can be used where their characteristics are more suitable for the end use intended.

The shape of the cell can vary widely since the shape has little effect on the operation within the cell which is controlled by the back pressure on the cell and the injection of the liquid in small streams or squirts of additional liquid into the pressurized super-heated vapor within the cell. The surfaces can be parallel so that the distance is constant and the liquid is sprayed from one surface toward the other, but again this is not essential. This allows the heat to reach from the surfaces to the interior of the cell to provide the flash evaporation. The distance between the surfaces can also vary widely and for example they could be shaped so that they are grooved or scalloped thereby optimizing contact area with a heat source. In other words, there are ways to increase surface area within the cell, thereby increasing steam production and controlling/influencing the rate of heat transfer.

The cells are arranged preferably end to end surrounding a heat source. However other arrangements are possible and the heat source may be arranged to pass between two cells or two or more of the cells can be stacked one on top of another. Various arrangements can be provided as required to extract maximum heat from the source.

Preferably the liquid is injected at a single location in the cell by a single injector. However in some cases additional injectors can be provided at different locations within the cell so that the whole cell is used to generate the steam. For this purpose, the liquid can be injected through one surface or both surfaces or along edges of the cell again with the intention that the whole cell is used.

In some cases such as for an exhaust manifold, the cell is formed by casting so that one wall is formed by the manifold itself while the other wall defining the second surface is formed as a spaced covering layer. In this way a cast manifold, incorporating a cell, can be shaped to precisely and uniformly match the existing manifold to avoid interfering with its design or function and the resulting cast manifold includes the outer layer which defines the cell as an additional layer or shell. In some cases the gas flows in the manifold are unchanged by fins or other obstructions which could interfere with the proper operation of the engine or other construction/source which produces the heat. Thus, in one example the first surface is cylindrical. However in some cases, fins, bars and other designs of obstruction can be used to aid transfer of heat to the inner wall surrounding the duct. In this case the shape and design of the manifold may need to be changed to accommodate the obstructions, which can interfere with exhaust flow, to avoid an unacceptable increase in back pressure at the exhaust ports.

Typically one or where possible both walls are directly in contact with the heat source. That is the wall is relatively thin and has an outer surface directly in engagement with the heat so that the heat directly transfers by conduction through the thin wall to the surface of the cell. That is there no fins on the walls so that the walls are directly in contact with the heat source. Typically the walls in contact with the heat source form smooth surfaces.

Preferably to achieve the continuous simultaneous instantaneous flash evaporation, the temperature in the cell is greater than 250 degrees F. Thus one surface is defined by a wall heated by direct contact with gas at high temperature much greater than 212 degrees F. and preferably greater than 450 degrees F. When used with automotive exhaust systems, the gas temperature can be 1400 to 1500 and as much as 1800 which is in the range of the optimum operational heat in diesel engine exhaust, for example, and the method anticipates use in such applications. The highest useable temperature in other gases can be much higher. Higher temperatures will permit injection of much greater volumes of water resulting in proportionally greater volumes of steam.

The pressure in the cell is typically greater than 40 psi, preferably greater than 50 and preferably of the order of 100 psi. The ultimate maximum operating pressure is potentially much higher and can be as much as 300 psi. It can be optimized in anticipation of use in a variety of internal combustion exhaust gas applications or to suit use with other heat sources.

It is important to keep in mind that exhaust gas is not the only potential source of heat. A system can, for example, be energized by use of a propane or natural gas burner, or other source of heat/energy (solar or industrial). Prospectively, a vehicle can use the cell as the principal source of driving force, and the internal combustion engine is eliminated entirely from the arrangement. Natural gas is of course a plentiful and inexpensive source of energy and is particularly suitable for use in this system for generating steam which can then be used in many energy conversion systems.

Thus the cell is configured and arranged so that it is not a tube with flow of liquid entered at one end and the discharge from the other end but instead the liquid is injected throughout the cell and the discharge is at a suitable location on the cell.

In many cases the outlet vapor is arranged to drive a turbine in a Rankine cycle engine where the vapor from the turbine is condensed to return to a supply tank for the injection liquid. However other energy conversion systems can be used. For example the method of generation of steam herein is particularly suitable for driving a conventional steam piston engine which is more forgiving about changes in temperature and pressure which may arise if the method is not properly controlled.

In one advantageous arrangement, the vapor from the turbine is condensed in a return pipe extending into the supply tank so that the liquid in the supply tank acts to cool the vapor in the pipe while heating the liquid in the tank. The return pipe may include a diffuser for injecting the condensed liquid and or vapor into the liquid in the tank. Generally a radiator or other heat extraction system will be required to remove some of the excess heat to prevent the liquid from boiling in locations where it is intended to be liquid. Typically the radiator is located upstream of the condenser.

The pathway for hot exhaust gases runs through either a single or multiple layers of heat conductive material so as to provide maximum surface contact between zones of heat generation and heat absorption.

In one example, the embodiment consists of two smooth non-concentric tubes situated so that viewed horizontally along its length, the bottom of the larger (exterior) tube is in continuous contact (fused/welded) with the bottom of a smaller (interior) tube. The outer perimeter serves as a containment for steam generated by heat transfer from hot exhaust gases passing through the inner tube, which serves as a main exhaust gas pathway and as a heat transfer medium. In the present embodiment, the entire structure is aluminum. The rate of heat transfer can be modified (increased) by fins extruded along the inner sidewalls of the exhaust gas conduit, and generally oriented so that they project inward towards the center of the tube. Passing hot gases thereby sweep a much larger surface than when passing through a simple smooth tube.

Whereas the inner tube is continuous, the outer is divided into segments (cells). Along any section of the vapor generator, the outer sleeve is sectioned so that for any given exhaust temperature the volume of segments (cells) nearest the hottest exhaust can be balanced with those further downstream. In this manner, while in operation and generating steam as a result of heat transfer, the number of calories per unit of time can be set so that performance as measured by both pressure and steam weight is more or less equalized or balanced across the system. The output of the first cell in a chain of cells leading from an exhaust valve and terminating at a header is therefore approximately equal. The cells nearest the exhaust can have a smaller volume than those further away (downstream). The reason for this adjustability follows. Water is continuously metered and injected at high pressure into each cell. Simultaneously, steam is released in bursts from the cells when pressure has reached the system set point. For example, injection can be 125 psi, while steam release is 110 psi through normally closed pressure relief valves set to open at 110 and close at 105. Normally closed valves build pressure to their high set point, then open only until pressure drops to the low set point.

The steam temperature typically runs between 300 and 400 degrees Fahrenheit. "Recharging" a cell's low set point pressure to high set point release takes only a couple of seconds. In a six cylinder internal combustion engine each exhaust port can carry a group of six cells, resulting in a matrix of 36 cells all set to deliver a 100 psi burst of steam. The result of blending that steam production together and piping it to a turbine is effectively a steady force of 100 psi. The calculated volume of steam measured in pounds of water per hour can exceed 2500 pounds of steam per hour.

Such a volume of steam at that pressure equals the equivalent of 60 shaft horsepower. In the case of the referenced 300 horsepower engine the recovered energy represents a 20% advantage. The integrated system consists of cells, exhaust liner (heat exchanger tube, or core) injection system, pressure relief network, with its steam output at constant pressure blended together to pass a significant volume of steam through a turbine which is harnessed to either a generator or mechanically back into a drive train or other suitable electrical or mechanical device. The steam is continuously condensed and recirculated.

Two applications for the system are stationary power generating stations, such as the common 250 KW units used by the US Military, and as a propane fired substitute for batteries in an electric car.

A glossary of terms and components is as follows:
Core=heat dissipating central tube
Cell=space between the core and outer shell of the pressure vessel divided into sections by half moon-shaped walls
Pressure vessel=generally the space between the outer wall of the core and the inner wall of the outer shell, along with any attached, sealed volumes open to pressure
Steam dome=a raised protrusion, part of the pressure vessel, designed to skim product off the top of the steam column where the gas is less likely to contain entrained water vapor
Steam manifold=the assembly of lines running from the domes to a central junction point from which steam is piped to final use or to be superheated

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
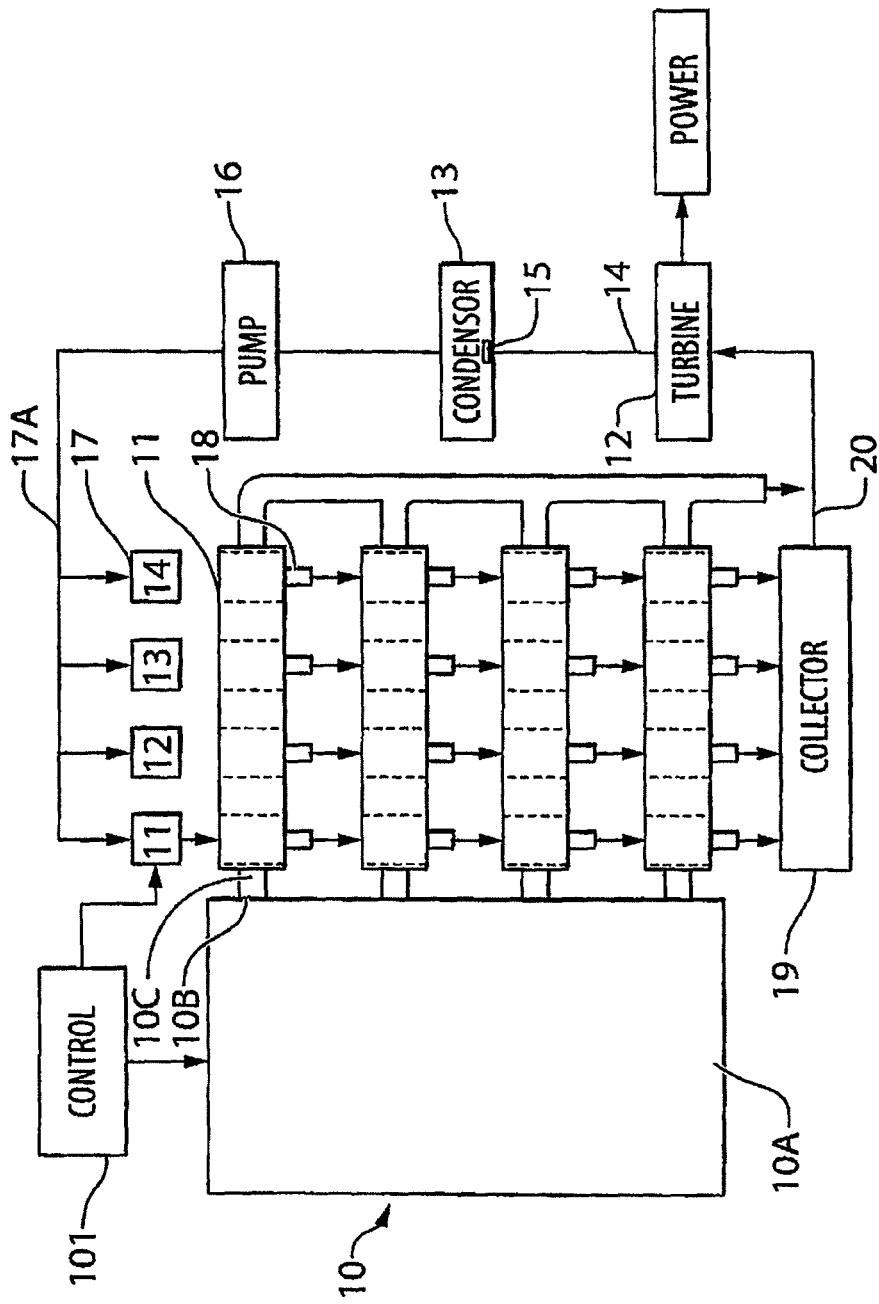
FIG. 1 is a schematic illustration of an apparatus and method for using waste heat from an engine for generating power.

As shown in the Figures there is provided an apparatus and method for evaporating a liquid to generate a pressurized vapor. This comprises a heat source 10 in the form of an engine 10A with exhaust ports 10B feeding exhaust ducts 10C.

At each duct 10C is provided a series of vaporization cells or cores 11 developing steam for a turbine 12 driven by the vapor generated by the cell 11, a return tank 13 for the condensing vapor, a return pipe 14 to carry the steam from the outlet of the turbine which includes a diffuser 15 and a pump 16 to transfer the liquid back to the cell through injectors 17 through lines 17A.

Each cell 11 includes walls defining two spaced surfaces 11C, 11D with an open chamber 11E therebetween with the surfaces located on the inside of walls 11A and 11B.

The walls 11A is in communication with a source of heat from the exhaust 10B within the duct 10C sufficient to maintain the surfaces at a temperature such that the liquid injected by injectors 17 through an inlet nozzle 11E into the chamber is substantially instantly converted to a superheated vapor with no liquid pooling within the chamber and is extracted from the cell by an outlet 11F for the vapor to escape.

The distance D between the surfaces 11C, 11D can be constant but in the arrangement shown is crescent shaped as explained in more detail hereinafter. The cell forms a single chamber without any dividing walls and including side edges 11G, 11H connecting the walls 11A, 11B. The ends are also closed by plates 11J, 11K.

The cell is formed generally into a cylinder where the inner wall 11A is cylindrical to surround the duct 10C and is closed by end plates 11J and 11K described in more detail later. In this case the outlet 11F is formed as a threaded hole in the wall 11D. The injector 17 extends through the outer wall 11B so that the liquid is injected toward the inner wall of the cell within the cell so that it spreads throughout the cell.

In the actual embodiment therefore, the surfaces of the cell are generally parallel but shaped out of a flat plane. Thus the wall 11B including the first cylindrical surface is shaped to follow and surround an exterior of a heat source in the pipe 11P and a second of the surfaces of the cell is generally parallel to the first and shaped to follow the first to define the cell therebetween. The wall 11B in contact with the heat source forms smooth surfaces.

In another arrangement not shown, the cell is formed by casting so that the inner wall follows the required shape and the outer wall forms a shell over the inner wall defining the cell.

Thus the surface is defined by the wall 11B is heated by direct contact with the gas in the pipe 11P at high temperature much greater than 212 degrees F. and preferably greater than 450 degrees F.

The outlet 11F defined by the opening in the wall 11B has an area significantly less than an area defined by a multiple of a width of the cell and the space between the surfaces. Thus the pressure in the cell is greater than 40 psi, preferably greater than 50 and preferably of the order of 100 psi or more.

As shown in FIG. 1, the vapor from the turbine is condensed in the return pipe 14 from the turbine extending into the supply tank so that the liquid in the supply tank acts to cool the vapor in the pipe 14 while heating the liquid in the tank. The pipe includes a vertical section extending into the tank to the bottom and a plurality of legs extending outwardly from the bottom toward the sides of the tans where a diffuser acts for injecting the condensed liquid and or vapor into the liquid in the tank. In most cases a radiator (not shown) is required immediately upstream of the condenser to extract excess heat from the system.

The method disclosed herein for evaporating a liquid to generate a pressurized vapor uses the cells 11 described above including walls 11A and 11B defining two spaced surfaces with an open chamber therebetween. The liquid is injected by injectors 17 including injectors I1, I2, I3 and I4 for a four cell system on each of the outlet ducts 10C. Thus each cell of the system can include its own injector or as shown the first cells on each duct 10C can be connected to the injector I1, the second cells to the injector I2 etc. This arrangement is used since the first cells on each duct meet the same conditions and the second cells on each duct meet the same conditions etc. The injectors are controlled by the engine control computer 101 of the conventional engine system. The injectors are of a type commercially available for example typically used to inject liquid dispersants into the exhaust of a diesel highway tractor to disperse solid contaminants generated at high power operation. Such injectors are typically piezo-electric in operation and can operate at pressures up to 20,000 psi. Thus the injector can be controlled in operation to turn on and to vary the rate of liquid injection either by directly changing a continuous flow rate or by changing the frequency of a periodic injection. Thus the injector has a frequency of injection which is controlled to provide a required quantity of liquid to prevent the pooling and ensure flash evaporation of all liquid injected while maintaining the amount of water evaporated at or close to a maximum which can be generated from the heat available in the cell. As the input liquid flow is controlled by injectors which are controlled by the engine control computer, these can be operated to supply liquid at a rate dependent on engine parameters as determined by the controller 101.

The surface of at least one of the walls 11A, 11B is in communication with the source of heat generated by the exhaust gases in the duct 10C which is sufficient to maintain the surface and the cell at a temperature such that the liquid injected into the cell is substantially instantly converted to a superheated vapor with no liquid pooling within the chamber.

The outlet 11F formed by the screw-threaded opening from the cell allows the vapor to escape. The pressure in the cell is maintained greater than 40 psi, preferably greater than 50 and preferably greater than 100 psi. In order to control the flow of vapor to maintain the required back pressure there is provided on each cell a relief valve 18 downstream of the outlet which acts to maintain the pressure. The relief valve is responsive to pressure in the cell so that the valve opens and closes at a rate to maintain the pressure between an upper value when the valve opens and a lower value when the valve closes. The values can be of the order of 110 psi and 90 psi to maintain the pressure at a nominal 100 psi. These values can be selected in a manner which operates the valve at period of the order of 1 to 2 seconds. As stated above, the relief valve is arranged to control release pressure and temperature in the cell so that no liquid is present in the cell. That is the flow rate escaping is sufficient to prevent accumulation of vapor sufficient to prevent all liquid from evaporating. The back pressure maintained in the cells ensures that the collected vapor is also at the same pressure as it departs the outlets and moves to a common collector 19 supplying the turbine. This pressure is selected to be suitable for or designed to match the turbine 12. In this embodiment as shown there are sixteen cells but this number can of course vary depending on the amount of heat available for extraction and bearing in mind the necessity to collect the periodic cell production into a continuous stream. Thus the output from the plurality of cells is connected together and collected at the common collector 19 which can be a simple pipe. The back pressure valve of each cell operates at a rate determined by the pressure in the cell to generate periodic bursts of vapor and the output from the cells is collected to form a continuous stream at the outlet 20 from the collector 19.

In the embodiment shown, the source of heat comprises a multiple cylinder internal combustion engine 10 with a plurality of exhaust ducts 10C and the sixteen cells arranged in series of four sequentially on each exhaust duct. 12. As explained previously, the input liquid flow is controlled by injectors I1, I2 etc where each injector supplies liquid to a plurality of cells at common position on the ducts.

Inside the duct 10C there are provided elements for controlling heat transfer from the duct to each cell where the elements are arranged so as to increase heat transfer to subsequent cells on same exhaust duct. Thus in FIGS. 2 and 3, the first cell 111 has the interior of the duct without any heat transfer elements in the interior so that the duct is clear or smooth at the surface 115.

As shown in FIG. 2 and FIGS. 3, 4 and 5, the further cell 112, 113 and 114 have elements within the duct and inside the inner wall for controlling heat transfer from the gas in the duct to the inner wall. Thus the elements are arranged such that the heat transfer of the cells is different from the heat transfer at the other cells with the intention to balance the heat applied to the cells bearing in mind that the heat available in the duct decreases along the duct, thus requiring an increase in heat transfer.

Figure 2:
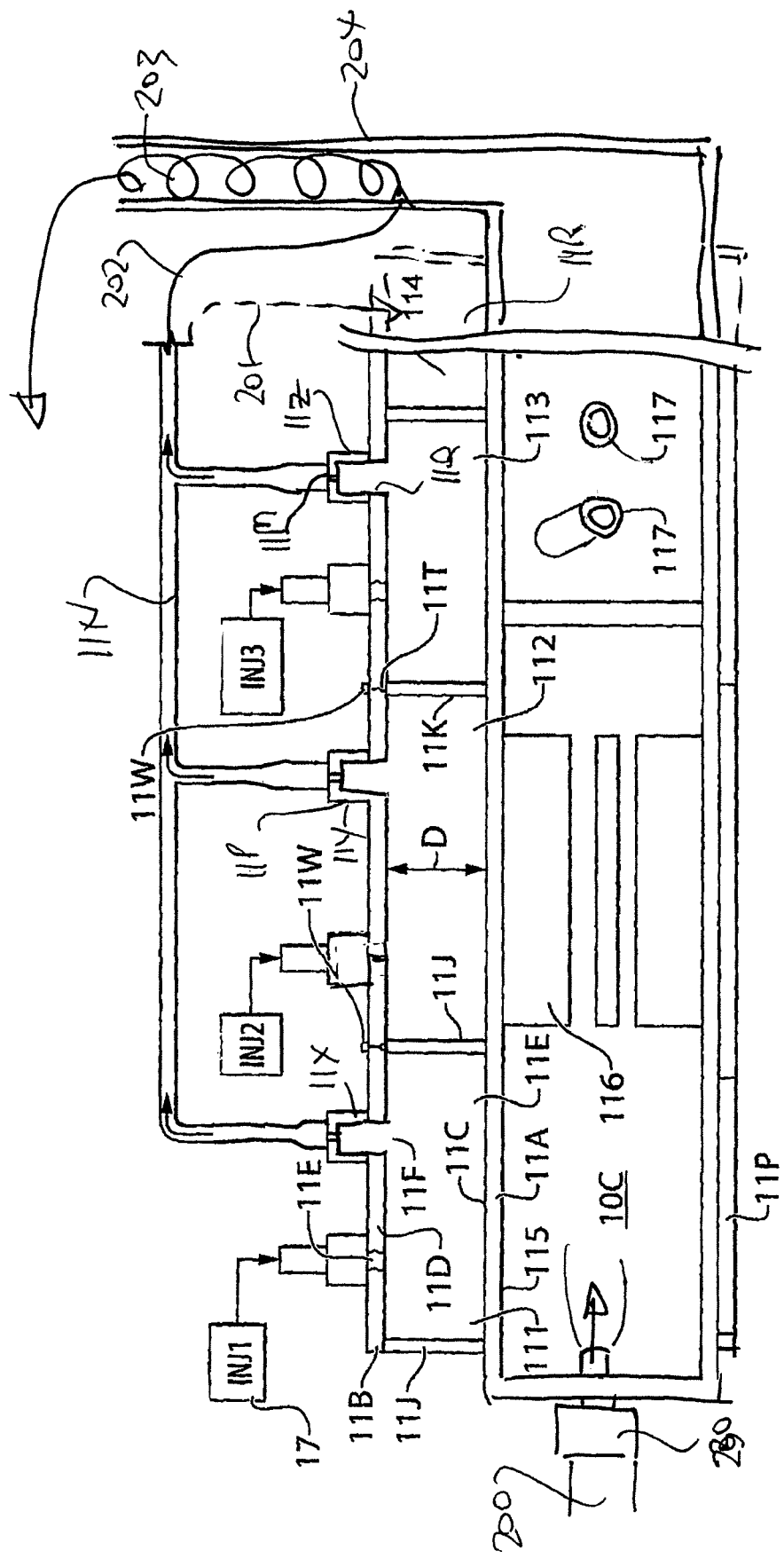
FIG. 2 is a longitudinal cross-sectional view of one duct of FIG. 1 showing three cells on the duct for generation of steam from the hot gas inside the duct.
Figure 4:
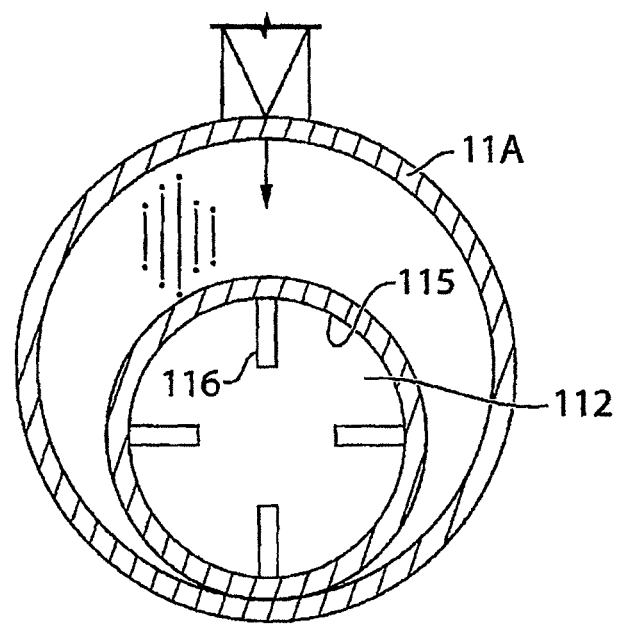

Thus in FIGS. 2 and 4, the elements 116 within the duct comprise longitudinally extending fins mounted on the inner wall at angularly spaced positions around the axis of the duct 115 and extending inwardly therefrom so as to transfer heat conductively to the surface 115.

Figure 5:
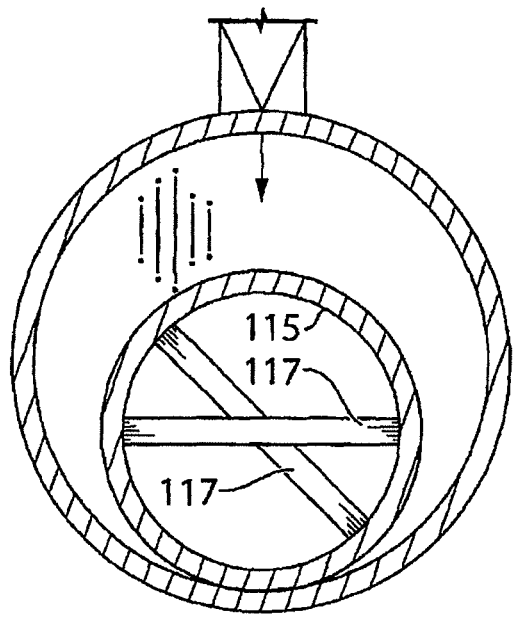

Thus in FIGS. 2 and 5, the elements 117 within the duct the elements within the duct comprise bars bridging the duct and connected at each end to the inner wall. The bars can be cylindrical and are arranged diametrically across the duct at spaced positions along the duct and can be rotated each from the next at a different angle so as to disturb the flow through the duct and transfer heat conductively to the surface 115.

Figure 6:
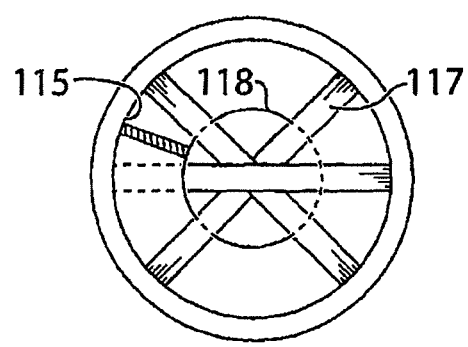
FIG. 6 is a cross sectional view similar to FIGS. 3, 4 and 5 showing an alternative form of the baffles within the duct.

The fixed cross members attached at both ends shown in FIGS. 5 and 6 are undesirable as differential expansion and contraction during repeated heating and cooling will act to stress those joints, cracking them and ultimately resulting in leakage that could lead to total system failure. The arrangement shown hereinafter is therefore preferred.

Thus in FIG. 6, the elements within the duct include a twisted or helical fin 118 formed by rotating the tube around its axis as it is extruded, together with additional transverse bars 117 bridging the inner surface within the tube. Thus this arrangement obtains the combined effect of the transverse disturbance bars and the fins which transfer heat to the inside surface.

Figure 3:
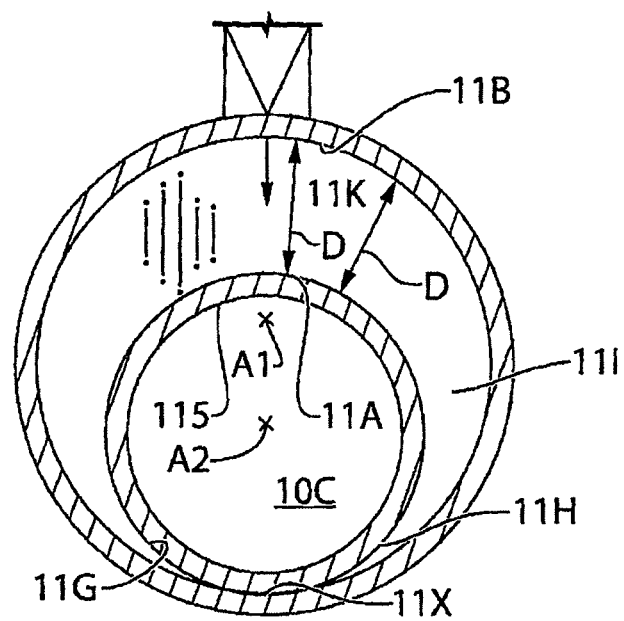
FIGS. 3, 4 and 5 are cross-sectional views along the duct of FIG. 2.

As shown in FIGS. 2 and 3, the cells are arranged such that the outer wall 11B has its axis A1 axially offset from the axis A2 of the inner wall so that an inside surface 11D of the outer wall 11B is in contact with an outside surface 11C of the inner wall 11A at one side 11X of the inner and outer walls with an opposite side of the outer wall 11B spaced by the distance D. The outer wall of each cell is formed from a cylindrical wall portion 11P wrapped around the inner wall forming the duct and welded along the touching bottom portion 11X. Each cell has a separate portion 11P and these are connected at crescent shape divider members 11J, 11K matching the shape of the cell. The cells are formed by welding the circular inner edge of the divider member to the inner wall 11A, by engaging the outer portion 11P around the inner wall and welding its end edges at weld beads 11T to the divider walls 11J, 11K. The next portion 11P is then welded around the outer edge to the first portion at weld bead 11W.

It will be appreciated that neither the inner wall 11A nor the outer wall 11B need to be circular in cross section. In this case the walls 11J and 11K are not crescent shaped but are instead shaped to match the space between the walls 11A and 11B which may be complex in shape. It is however desirable that at some location around the periphery of the inner wall 11A there is contact with the wall 11B to ensure conduction transfer of heat between the walls to reduce the possibility of liquid pooling.

The system operates as follows, using the process steps 1 to 12 shown in FIG. 1:

1. The heat source 10 is a hot exhaust electricity, gas or any high temperature source that will super heat the vaporization core.

2. Pressurized water is infected by injector 17 into the super-heated vaporization cell 11.

3. The vaporization cell 11 can be any shape. Instead of generating steam in traditional low volume tubes, the thin high volume design vaporizes water instantly as it is injected into the super-heated cell. It allows for variable low or high volume instant vaporization from water to steam.

4. Super-heated steam is exhausted through the turbine 12 at variable pressures related to the temperature of the vaporization cell and the volume of water being injected. Vaporization efficiency also increases as the water becomes pre-heated on the return exhaust cycle to the non-pressurized holding tank 13.

5. A pre-condensate return system may be provided to take non-vaporized water directly back to the holding/pre-heating tank via high pressure or a mechanical pump. The system can be used to keep "swamping" from occurring in the vaporization cell. However the back pressure and timed release of the vapor obtained by the valve is used to maintain the cell liquid free.

6. Steam is forced through the turbine 12 which turns an electric generator or other mechanical devices.

7. Exhausted steam from the turbine 12 is immediately returned to the holding tank 13 for re-use and to preheat the supply.

8. The holding and pre-heating tank collects the high pressure steam through a "diffuser" 15 which is located at the bottom of the tank's total water volume. By forcing the diffused steam through the high volume, non-pressurized condensate allows for a quicker return of steam to water while pre-heating the overall water supply at the same time. A radiator is provided to extract excess heat.

9. The high pressure steam tank diffuser 15 slows and disperses the delivery of the steam back into the bottom of the holding tank. It forces the exhaust to slow and to start condensing before entering the tank.

10. Water from the holding tank 13 is pumped or forced to the vaporization chamber via the use of a mechanical pump or pressurized air 16. An injector can also be provided which is fed by the pump and injects the liquid at high pressure and controlled rate.

11. A compressed air system or an electric, mechanical pump 16 forces water from the holding tank to the pressure regulated injectors into the vaporization cell.

12. Pressurized and regulated water injection line(s) 17A feeds injectors 17 and vaporization cell 11.

Turning now to FIGS. 2, 7, 8 and 9 there is disclosed the following additional features.

The steam generated in each cell 11 is extracted from the cell concerned at an outlet 11X, 11Y and 11Z where each outlet is provided in the peripheral wall 11B. Each outlet comprises an outlet dome arrangement 11 including a first dome portion 11P connected to the peripheral wall at a mouth 11Q of larger cross-section or diameter into which the steam escapes from the cell so that the steam rise into the done and sits in the dome until some escapes though a small outlet 11M which is dimensioned to extract the amount of steam generated in the cell. The outlet 11M is thus of smaller cross-section at the outer wall of the dome portion 11P than the mouth 11Q. The outlet 11M through which the steam escapes from the dome portion controls the flow of the steam so that the outlets 11M are connected to a common manifold 11N without any control valves.

The steam collected from the cells in the manifold or pipe 11N is transferred back to the receive extra heat from the heat source for superheating the steam. This helps to reduce exhaust temperature and provides increased efficient. As shown in FIG. 2, the stream in the pipe 11N is shown transferred back through a duct 201 to an additional cell 11R on the duct either at the front of the duct adjacent the heat source 200 or at the downstream end of the duct. Alternatively or in addition the steam from the pipe 11N is transferred by a duct 202 to a coil 203 within the flue 204 of the heat source. Thus additional heat is applied to the steam without addition of further water so that the steam is superheated. The cell or coil could also be made of copper as there is no open flame and copper would assist drawing heat more efficiently. The collected steam is transferred back to one cell between the duct and the peripheral wall for receiving the extra heat without addition of further injected water.

One option therefore is to provide an additional cell in the exhaust stack. While that might be done, it makes less sense than using the opportunity as a steam only, in and out, super heater.

The stack is a great place for super heating already generated steam, but a poor place for primary generation.

Most of the heat is nearer the inlet than the outlet of the vaporizer. Add to the main unit directly if one wants more primary generating capacity. That is where heating through radiation and conduction in the steel shell from the hot gases can most easily be harvested and shared among the cells. By the time the gases get to the stack heat is reduced, and the effect of metal conduction, as in the main body, is used up.

The super heater in the stack can be simply of traditional design using a curly cue of convoluted tubing wound around in various ways to provide a large surface area through which to increase the temperature of the already generated steam. The most likely metal to use is stainless steel, not copper because while either metal might work, and copper has higher "K" value, it suffers more from corrosive effects in flue gases.

The tube can be bent back and forth, wound in a helix, woven in a serpentine manner, etc. The objective is to pack plenty of opportunity for picking up heat from passing exhaust in a relatively short run of exhaust pipe, without clogging the exhaust.

Figure 7:
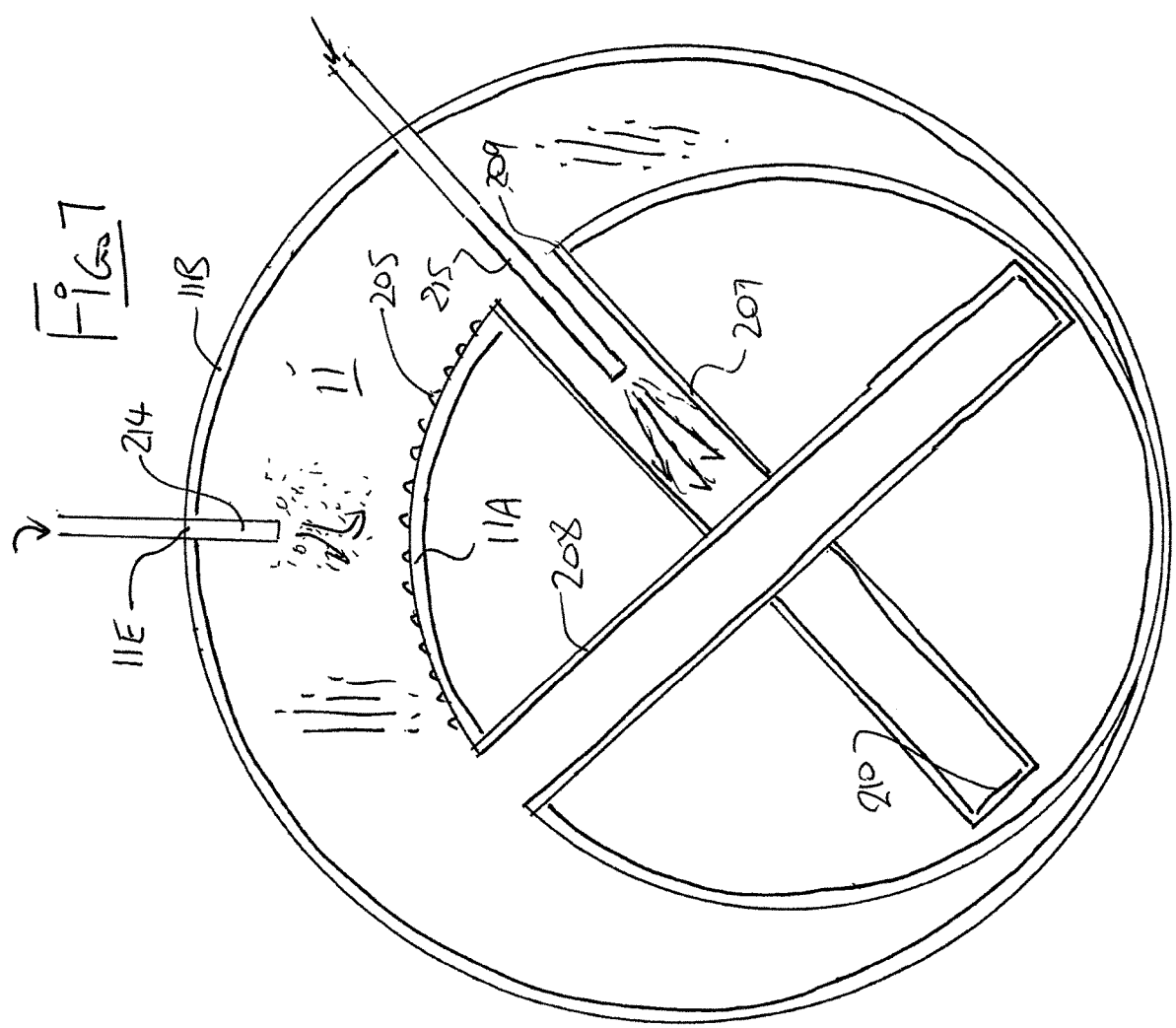
FIG. 7 is a cross sectional view similar to FIGS. 3, 4 and 5 showing an alternative form heat transfer member within the duct in the form of a hollow tube.

As shown in FIG. 7, the heated gas is injected by an inlet feed 200 of a fuel gas which is ignited and burns in the duct. The inlet feed includes a vena contracta 230 at the inlet end.

As shown in FIG. 7, the duct 11A has an exterior surface which is pebbled or roughened at 205 to provide a greater surface area. The surface can also be fluted to prevent water from rolling around the inner duct 11A. Once the surface is drenched any excess water will run along the inner duct wall 11A and will vaporize. This can be used to avoid any standing water left behind.

Also as shown in FIG. 7, there is provided a series of hollow tubes 207, 208 transferring heat by providing heat conducting elements within the duct 11A. The heat conducting elements 207, 208 extend across the duct and each comprises a hollow tube extending through the duct wall 11A so as to provide a communication between an interior of the hollow duct and the chamber or cell 11. In FIG. 7 the end of the tubes at the wall 11A is welded flush with the outer surface of the wall of the duct as indicated at 209. The hollow tubes 207 and 208 extend diagonally across the duct 11A and are closed at the end within the duct which is closely spaced from the opposite wall of the duct.

Figure 8:
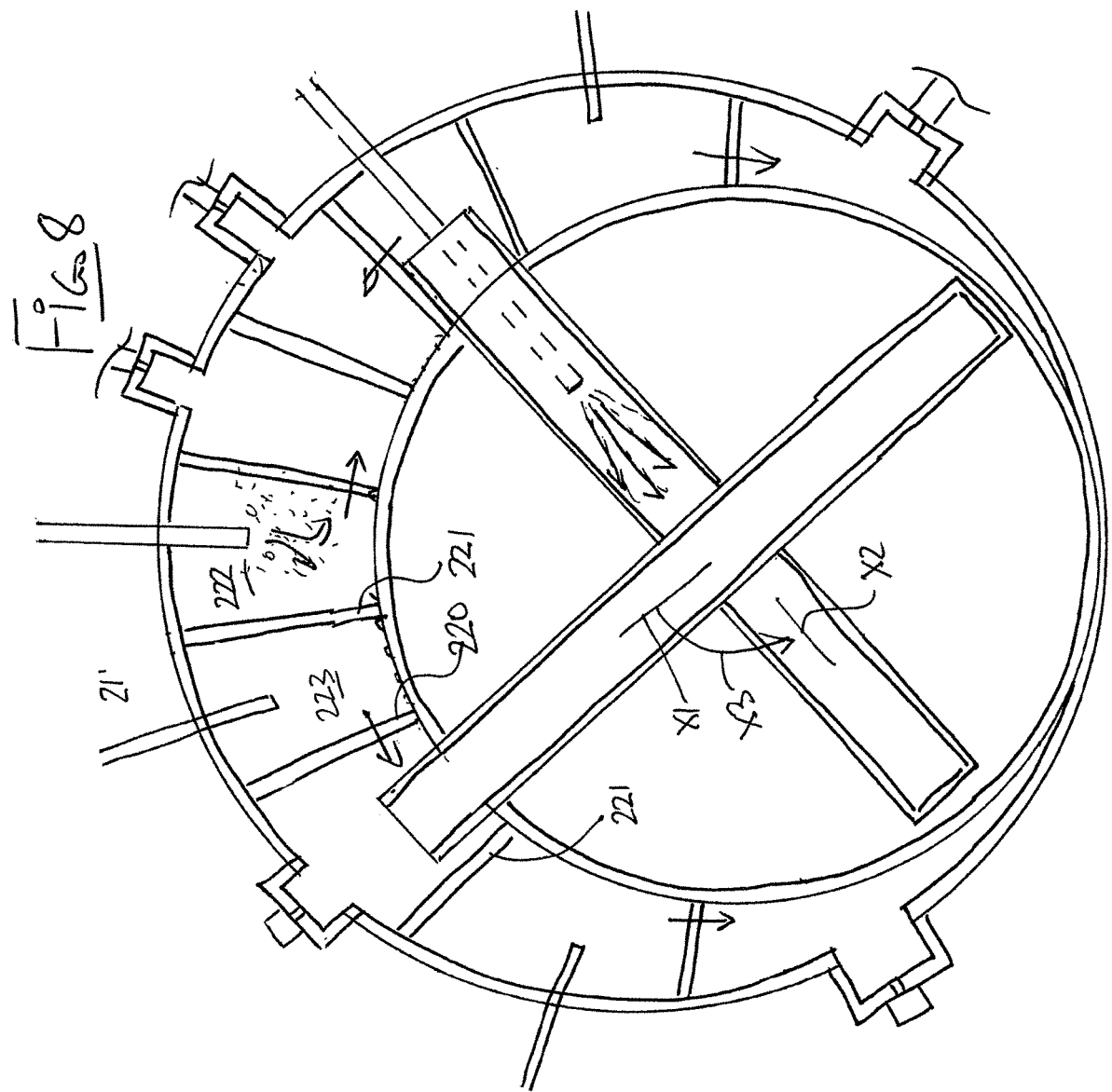
FIG. 8 is a cross-sectional view of an alternative construction of the duct and cells thereon where the cells are formed by pairs of channels separated by longitudinally extending fins.

In other arrangements as shown for example in FIG. 8 the hollow tubes include a portion thereof projecting outwardly from the duct wall 11A into the chamber 11. In other arrangements, the hollow tubes have a cross section 211 which is non-circular so as to cause diversion of air flowing in the duct toward one side of the duct. The duct thus can be oval, elliptical or rectangular with one axis longer than the other so as to form a blade or sail directing the flowing heated gas across the duct toward the side wall as indicated by the arrow 212. It will also be seen from FIG. 7 that the axis X1, X2 of each hollow tube is angularly rotated as indicated at X3 around an axis of the duct from the next.

As shown in FIG. 7, the water is injected into the cells by atomizing nozzles 214, 215 at water injection points. As shown at 214, the atomizing nozzle directs the mist onto the pebbled or roughened surface 205. As shown at 215, the nozzle directs the water directly into the hollow interior of the tube 209. It will be appreciated that the intention is to direct the water onto the surfaces which are at the highest temperature to provide the flashing of the water into steam as previously discussed.

Figure 9:
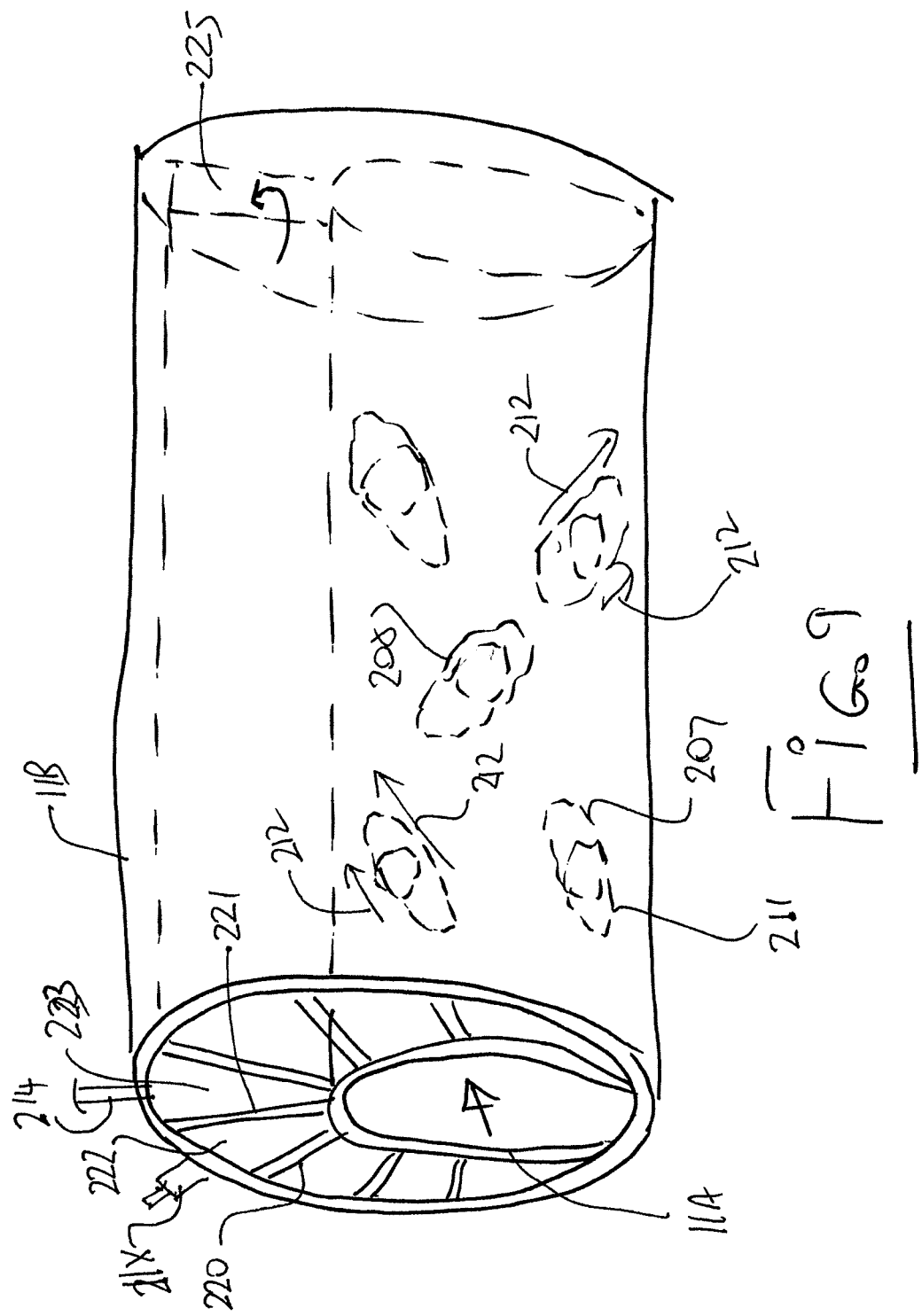
FIG. 9 is an isometric view of the embodiment of FIG. 8 showing the pairs of channels defining the cells.

Turning now to FIGS. 8 and 9, there is shown an alternative embodiment in which the walls 11J, 11K etc are omitted so that the channel 11 is not divided transversely in radial planes of the axis but instead there are provided dividing walls 220, 221 which form fins running longitudinally of the duct and connecting the duct wall 11A and the peripheral wall 11B so as to form a plurality of pairs of longitudinal channels 222 and 223 that are adjacent and operate as a pair. The water injection nozzles 214 are located at the leading end of a first channel 222 of the pair and the extraction outlets 11X of the steam is taken from the leading adjacent end of the second channel 223 of the pair. The pair are interconnected at the opposite end 226 at the trailing end of the duct by a transfer connection 225. This acts to form creating a steam pathway that is twice the length of the channels as the water when injected onto the surface 11A passes along the first channel 222 to the far end and then travels back along the channel 223 to the outlet at the leading end.

In order to provide an effective technique for manufacturing the complex structure formed by the walls 11A and 11B and the fins 220, 221, the duct, dividing walls and peripheral wall are formed as an integral structure by 3D printing.

The invention claimed is:

1. A method for evaporating water to generate pressurized steam comprising:

passing a heated gas through a duct along a longitudinal direction of the duct from a feed end of the duct to a discharge end of the duct;

the duct including a duct wall surrounding an axis of the duct with the duct wall extending continuously in the longitudinal direction from the feed end at one longitudinal end of the duct to the discharge end at the other end of the longitudinal duct;

a peripheral wall surrounding the duct at a position on the duct between the feed end and the discharge end defining a chamber between the peripheral wall and the duct wall;

dividing the chamber by dividing walls into a plurality of separate cells;

injecting the water as a water spray into each of the cells through an injector nozzle mounted in the peripheral wall directed into the chamber from the peripheral wall toward an outside surface of the duct wall;

causing the water spray injected into the chamber to be converted substantially instantaneously to steam with no water pooling within the chamber by maintaining a required pressure within the chamber and by maintaining the heated gas inside the duct at a required temperature;

and collecting the steam from for each of the cells.

2. The method according to claim 1 wherein the chamber is divided by said plurality of dividing walls extending transverse to the axis of the duct and arranged at axially spaced positions along the axis of the duct so as to divide the chamber into said separate cells which are arranged end to end along the duct.

3. The method according to claim 1 wherein each dividing wall has an inner edge in engagement with the duct wall and an outer edge in engagement with the peripheral wall so that each cell is separated from a next adjacent cell by a respective one of the dividing walls to prevent the passage of steam from one cell to the next adjacent cell.

4. The method according to claim 1 wherein the temperature in the cell is greater than 250 degrees F. so as to generate superheated steam instantly.

5. The method according to claim 1 wherein the pressure in the cell is maintained greater than 40 psi.

6. The method according to claim 1 including transferring heat using heat conducting elements connected to the duct wall so as to extend into the duct and so as to receive heat from inside the duct and conduct the heat to the duct wall and thus to each cell wherein a first cell includes first heat conducting elements and a second subsequent cell includes second heat conducting elements and wherein the first and second heat conducting elements are arranged such that an amount of heat transferred to the duct wall by the first conducting elements within the duct to the first cell is less than heat transferred to the duct wall transferred by the second conducting elements within the duct to the second subsequent cell.

7. The method according to claim 1 wherein an outlet for the steam is provided in the peripheral wall.

8. The method according to claim 1 wherein the peripheral wall is axially offset from the duct wall so that a portion of an inside surface of the peripheral wall extending longitudinally along the peripheral wall is in contact with a portion of an outside surface of the duct wall extending longitudinally along the duct wall.

9. The method according to claim 1 wherein there are provided heat conducting elements connected to the duct wall so as to extend into the duct communicating with the duct wall so as to receive heat from inside the duct and conduct the heat to the duct wall.

10. The method according to claim 1 wherein the duct extends in a straight path with the cells arranged along the straight path.

11. The method according to claim 1 wherein the collected steam is transferred to a conduit in communication with an exhaust flue.

12. The method according to claim 1 wherein the duct has an exterior surface which is pebbled or roughened to provide a greater surface area.

13. The method according to claim 9 wherein the heat conducting elements comprise hollow tubes extending through the duct wall so as to provide a communication between duct and the chamber.

14. The method according to claim 13 wherein the hollow tubes include a portion thereof projecting outwardly from the duct wall into the chamber.

15. The method according to claim 13 wherein the hollow tubes are closed at an end within the duct spaced from the wall of the duct.

16. The method according to claim 13 wherein the hollow tubes have a cross section which is non-circular so as to cause diversion of air flowing in the duct toward one side of the duct.

17. The method according to claim 1 wherein the duct, dividing walls and peripheral wall are formed as an integral structure by 3D printing.

18. The method according to claim 1 wherein the heated gas is injected by an inlet feed which includes a vena contracta at the inlet end.

19. The method according to claim 1 wherein the steam is extracted from each cell by an outlet dome arrangement including a first dome portion of larger cross-section into which the steam escapes and smaller cross-section outlet at an outer wall of the dome portion through which the steam escapes from the dome portion.

* * * * *